United States Patent [19]

Vachon

[11] Patent Number: 5,332,053

[45] Date of Patent: Jul. 26, 1994

[54] HYDRAULIC DRIVE SYSTEM

[75] Inventor: Bertrand Vachon, Thetford Mines, Canada

[73] Assignee: Aquilon Technologies Inc., Québec, Canada

[21] Appl. No.: 9,087

[22] Filed: Jan. 26, 1993

[51] Int. Cl.$^5$ .............................................. B60K 17/28
[52] U.S. Cl. ...................................... 180/53.4; 60/421; 60/428; 180/306
[58] Field of Search ..................... 180/53.4, 53.1, 305, 180/306; 60/428, 429, 427, 421

[56] References Cited

U.S. PATENT DOCUMENTS 3,312,059  4/1967  Stuteville .......................... 60/421

FOREIGN PATENT DOCUMENTS 2308810  9/1973  Fed. Rep. of Germany ........ 60/421
3319533  11/1984 Fed. Rep. of Germany ..... 180/53.4

Primary Examiner—Eric Culbreth

Attorney, Agent, or Firm—ROBIC

[57] ABSTRACT

A combined hydraulic circuit to be used with a hydraulically powered implement of a motorized equipment and its engine-driven host vehicle. The combined hydraulic circuit allows the implement to be operated with a vehicle, such as a tractor, which does not have the adequate capacity to power the implement without the usual requirement of using an hydraulic fluid reservoir and a filter in the independent hydraulic circuit of the implement. Instead, the implement uses the tractor hydraulic circuit to clean, cool and pressurize in part the hydraulic fluid in its hydraulic circuit which has a hydraulic motor or a hydraulic cylinder driven by a hydraulic pump. This hydraulic pump can be a generated orbital rotor pump since the supplied fluid entering the pump is already pressurized unlike a circuit that uses a hydraulic fluid reservoir. The implements may be rotary brooms, mowers, portable saw mills, hoeing machines, loaders or snowblowers.

3 Claims, 1 Drawing Sheet

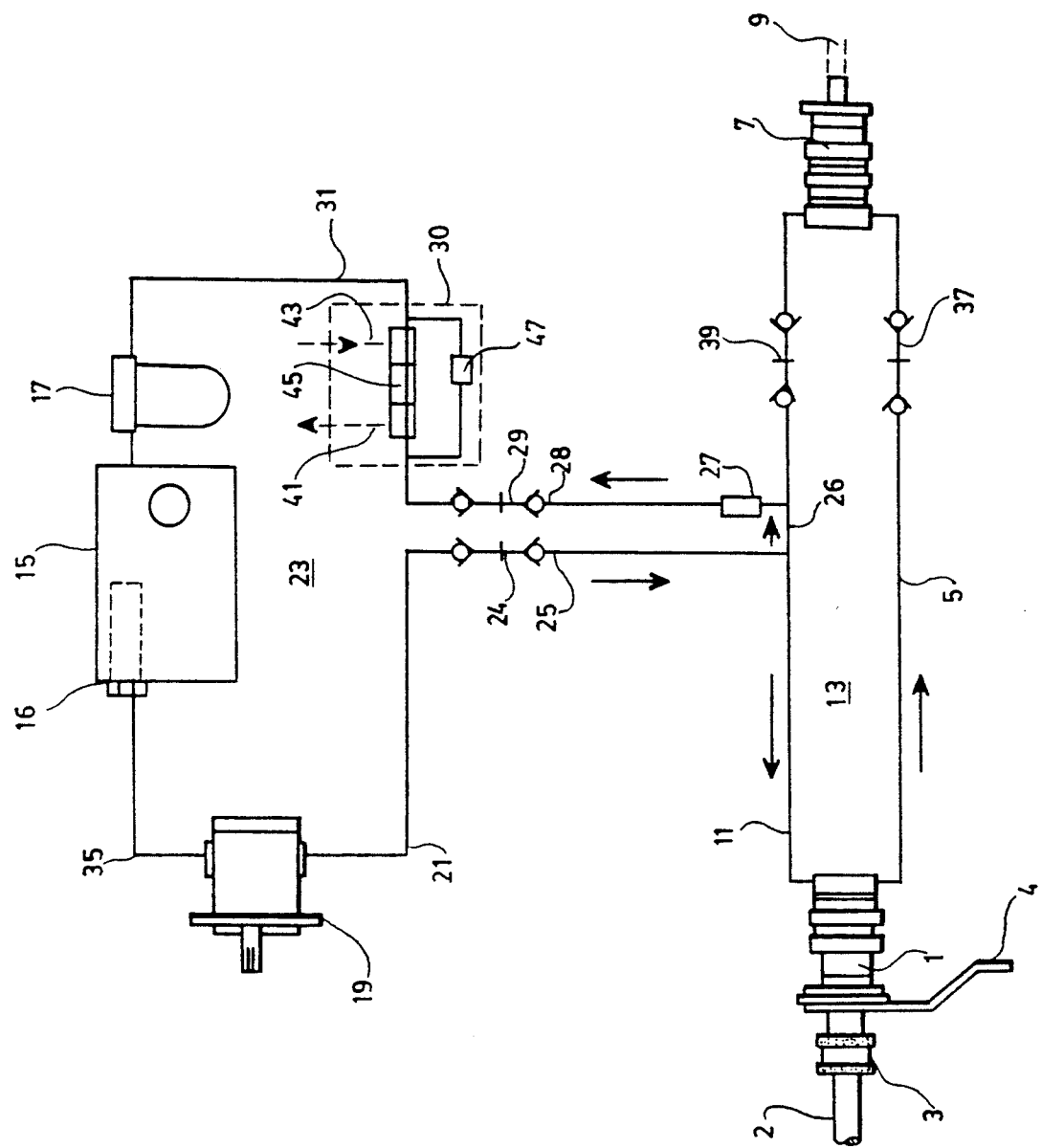

HYDRAULIC DRIVE SYSTEM

FIELD OF THE INVENTION

The present invention relates to a motorized equipment comprising an engine-driven vehicle and at least one hydraulically-driven implement located on or near the vehicle. More particularly, it relates to such equipment where the hydraulic system of the vehicle does not have the adequate capacity to power the hydraulic implement, thereby making it necessary to have an independent hydraulic system to drive the implement. The invention allows the hydraulic system of the implement to use the vehicle hydraulic fluid reservoir and filter.

More particularly, the invention allows implements to be operated on or from tractors by using the tractor pump and oil to charge, pressurize and cool the closed loop system which for the first time adapts a high efficiency generated orbital rotor motor for use as a pump at low input speed.

This system, as an example of one of many potential applications, includes a orbiting gerotor pump that may be mounted on and driven from the tractor conventional 540 RPM rear power take off, hydraulic devices such as a hydraulic motor or a hydraulic cylinder, connecting hoses between the pump and the hydraulic devices and between the circuit and the tractor hydraulic system, and a low pressure relief valve to maintain a constant pressure into the pump inlet to prevent cavitation of the generated orbital rotor pump.

Control valves, couplers, additional relief valves or other components may also be added to the circuit.

DESCRIPTION OF THE PRIOR ART

It is known to power implements hydraulically from the tractor pump, particularly implements such as rotary brooms, mowers, portable saw mills, posthole augers, post pounders, hoeing machines, loaders and snowblowers. So far, the equipments of this type require a tractor with a large hydraulic capacity because the tractor pump has to power the hydraulic devices of the implement. When using a small tractor with an insufficient hydraulic capacity to power the implements, an independent hydraulic system is normally required, which includes pump, reservoir, filter, hoses and fittings. Such independent hydraulic system has several drawbacks:

- the independent reservoir is costly, bulky, contributes to the tractor unbalance and is difficult to install and remove because of its weight. Since this is only required on small tractors, this weight problem is accentuated,
- the oil filter, extra hoses and fittings connected to the reservoir are costly, cumbersome and require extra maintenance,
- the most efficient pump alternative for this application is a mounted gear pump which is costly, bulky, heavy and not efficient at slow speed such as less than 700 RPM. For this reason, a speed-up means is normally required but adds further expense, bulk and weight to the system. Its high cost puts hydraulically powered implements at an extreme cost disadvantage against mechanically driven implements, and its size contributes to the difficulty of installation and removal.

SUMMARY OF THE INVENTION

The object of the present invention is to provide a means for powering hydraulic implements detachably connectable to an engine-driven vehicle which has an insufficient hydraulic system capacity to power said implements without the requirement of an independent hydraulic fluid reservoir and a filter.

The motorized equipment according to the invention comprises an engine-driven vehicle, like a tractor for instance, with a hydraulic circuit. That hydraulic circuit comprises a first hydraulic pump driven by the engine of the vehicle, a hydraulic fluid reservoir, a filter, and a set of hydraulic lines connecting together all those elements, thus creating a first loop in which a hydraulic fluid is circulated. The purpose of the hydraulic fluid reservoir is to store the excess of hydraulic fluid and to cool it while it is in the reservoir. The main task of the first hydraulic pump is to give some pressurized hydraulic fluid to equipments on the vehicle. Those equipments may be hydraulic cylinders or hydraulic motors.

The motorized equipment also comprises a motorized implement detachably connectable to the vehicle, such as a rotary broom, a mower, a snowblower, a portable saw mill, a hoeing machine or a loader, comprising a hydraulic circuit with a second hydraulic pump connected to power means to drive the same, and hydraulic devices, such as hydraulic motors or hydraulic cylinders, connected to the second hydraulic pump by means of a second set of hydraulic lines to form a second loop.

The improvement of the present invention consists of an assembly comprising a pressure hose directly connecting the fluid outlet of the second hydraulic pump to the fluid inlet of the hydraulic devices, a suction hose directly connecting the fluid outlet of the hydraulic devices to the fluid inlet of the second hydraulic pump, an inlet hose connecting the pressurized fluid outlet of the first hydraulic pump to the suction hose and an outlet hose connecting the suction hose to the return inlet of the first loop leading to the hydraulic fluid reservoir. The outlet hose is connected to the suction hose between the inlet hose and the hydraulic devices. A pressure relief valve is mounted in line onto the outlet hose. The hydraulic fluid circulating into the first loop is supplied to the second loop by the first hydraulic pump through the inlet hose and then is circulated through the second loop by the second hydraulic pump for driving the hydraulic motor or cylinder. Any fluid in excess is being automatically returned to the hydraulic fluid reservoir of the first loop through the return hose, thus making it unnecessary for the second loop to have a hydraulic fluid reservoir and a filter, the supplied hydraulic fluid coming from the inlet hose being cooled and filtered in the first loop. The hydraulic fluid that leaves the second loop in the outlet hose is cooled and filtered in the first loop and then returned eventually to the second loop. The pressure relief valve mounted in line onto the outlet hydraulic hose maintains a constant pressure in the second loop so that the second hydraulic pump can work at the optimum pressure and the rotation speed of the hydraulic motor is constant.

As can be understood, the invention allows significant cost reduction of the hydraulic system through the substitution of a much smaller and less expensive generated orbital rotor motor, with minor modifications as required, similar to the HB Series TM manufactured by White Hydraulics TM, or any similar motor, in place of standard pump and reservoir systems. Because the gears in such motors nutate six or eight times, depending upon ratio, for every shaft rotation, high fluid displacements at low output speeds are provided, and therefore not require a secondary gearbox speed-up for reaching peak efficiency and more efficient at 540 RPM than a conventional gear pump. However, no means have ever been developed until now to efficiently use this motor as a pump.

The invention allows to eliminate the possibility of cavitation made likely by the use of a generated orbital rotor motor, not designed for suction and therefore easily susceptible to cavitation, as a pump. An object is to use the tractor pump as a charge pump to provide hydraulic fluid and constant pressure to the closed loop system.

As can also be understood, the invention provides means for universal adaptation of this invention on all possible implements and on the full range of agricultural, industrial and turf tractors, so that one hydraulic circuit can be used to power all implements on a particular tractor, and so that the owner of multiple tractors can transfer the hydraulic package from tractor to tractor, powering the same, or different implements.

The invention provides means for quickly attaching and detaching the implement from the tractor without breaking hydraulic lines. This may also be done by one person. The invention further allows the elimination of mechanical drive-shafts between the tractor and the implement which are responsible of a large number of accidents.

A non-restrictive description of a preferred embodiment of the invention will now be given with reference to the appended drawings.

BRIEF DESCRIPTION OF THE DRAWINGS

FIG. 1 is a schematic representation of the hydraulic circuit used in a motorized equipment according to the invention.

DESCRIPTION OF A PREFERRED EMBODIMENT

As aforesaid, the motorized equipment according to the invention comprises an engine-driven vehicle, like a tractor for instance, and a motorized implement detachably connected to the vehicle. The implement may be located on or somewhere around the tractor. The tractor comprises a hydraulic pump 1 connected to a shaft 2 driven by the engine of the host tractor (not shown). The hydraulic pump 1 supplies the hydraulic devices of the implement and is prevented from turning with the shaft 2 by means of a bracket 4 attached to the hydraulic pump 1 and to the frame of the tractor (not shown). A quick disconnectable coupler 3 may be used to connect the shaft 2 to the hydraulic pump 1 so it could be easily separated from the tractor. A pressure hose 5 is directly connecting the outlet of hydraulic pump 1 to the inlet of a hydraulic device such as a hydraulic cylinder or a hydraulic motor 7 which drives a shaft 9 that is connected to an equipment (not shown) such as a rotary broom, a mower, a snowblower, a portable saw mill, a hoeing machine or a loader.

The hydraulic pump 1 pumps a hydraulic fluid that comes in a suction hose 11, directly connecting the outlet of the hydraulic motor 7 to the inlet of the hydraulic pump 1, into the pressure hose 5 and thus gives energy to the hydraulic motor 7. The hydraulic fluid leaves the hydraulic motor 7 in the suction hose 11.

The hydraulic pump 1, the hydraulic motor 7, the pressure hose 5 and the suction hose 11 are forming a closed loop 13. Other hydraulic devices such as hydraulic cylinders or additional hydraulic pump may be included in the loop 13.

The engine-driven vehicle has its own hydraulic system comprising a hydraulic pump 19 driven by the tractor engine (not shown), a hydraulic fluid reservoir 15, a strainer 16, a filter 17 and a set of hydraulic lines 21, 31 and 35 forming the loop 23.

The hydraulic pump 19 pumps the hydraulic fluid stored in the hydraulic reservoir 15. A strainer 16 prevents particles in the reservoir 15 from going into the circuit. The hydraulic fluid leaving the hydraulic pump 19 then circulates in the hydraulic line 21 connected to a hydraulic line 25 by means of a hydraulic connector 24. The hydraulic line 25 is connected to the suction hose 11. The hydraulic pump 19 supplies hydraulic fluid to the loop 13 in the same quantity that hydraulic fluid is retrieved from this loop 13 via the hydraulic hose 28. This retrieved hydraulic fluid supplies the hydraulic equipments on the tractor, such as hydraulic motors, hydraulic cylinders or the servo-direction (not shown). This allows the hydraulic pump 19 to pressurize the loop 13 and, in the same time, be able to operate the hydraulic equipments on the tractor. If not swallowed by the hydraulic pump 1, the hydraulic fluid coming from the hydraulic pump 19 or a portion of it goes through the section 26 of the suction hose 11 to the hydraulic line 28 which returns the hydraulic fluid to the loop 23. An in-line mounted pressure relief valve 27 keeps a constant low pressure in the loop 13. This low pressure may be between 50 to 300 psi. The hydraulic line 28 is connected to the hydraulic line 31 by means of a hydraulic connector 29. The hydraulic fluid leaving the hydraulic motor 7 or other hydraulic devices of the implements travels in the suction hose 11 and then enters the hydraulic line 28 with the non-swallowed fluid, if any.

The tractor hydraulic equipments may be plugged to the loop 23 by means of the control valve assembly 30 which comprises a fluid inlet 41, a fluid outlet 43 and a control valve 45 mounted in line on the hydraulic line 31. The control valve 45 controls the flow of the hydraulic fluid to the equipments. A pressure relief valve 47 prevents a pressure build-up when the control valve 45 does not allow enough fluid to go through.

The filter 17 removes dust and other debris from the hydraulic fluid which goes next into the hydraulic reservoir 15 that stores and cools it.

The supplied pressurized hydraulic fluid coming through the inlet hose 25 allows the use of a hydraulic generated orbital rotor motor as the hydraulic pump 1. This was not possible before, since the generated orbital rotor motor is not designed for suction in a hydraulic fluid reservoir. The use of such motor as a pump provides a high fluid displacement at low rotation speeds and does not require a secondary gearbox speed-up in order to reach maximum efficiency at low input speed.

When no implement is in use, all the hydraulic fluid goes through the section 26 of the suction hose 11. The implements can be removed by disconnecting the hydraulic connectors 37 and 39. Those connectors are designed to be assembled quickly with the other half and are self-closing when they are detached.

Other equipments, such as control valves or additional pressure relief valves, may be added in the hydraulic circuit.

What is claimed is:

1. In a motorized equipment comprising:
   an engine-driven vehicle including a hydraulic circuit comprising:
   - a first hydraulic pump driven by said engine,
   - a hydraulic fluid reservoir,
   - a filter,
   - a control valve assembly for supplying hydraulic equipments on said vehicle, and
   - a first set of hydraulic lines connecting together said first hydraulic pump, said reservoir and said filter for forming a first loop in which a hydraulic fluid is circulated by the first hydraulic pump, said first loop including a pressurized fluid outlet and a fluid return inlet to which an external hydraulic accessory is operatively connectable; and
   a hydraulically powered implement detachably connectably to the vehicle and including another hydraulic circuit comprising:
   - a second hydraulic pump having a fluid inlet and a fluid outlet,
   - power means connectable to said second hydraulic pump for driving the same,
   - a hydraulic device having a fluid inlet and a fluid outlet, and
   - a second set of hydraulic lines connecting together said second hydraulic pump and said device for forming a second loop;
   the improvement wherein said second set of hydraulic lines consists of:
   - a pressure hose for directly connecting the fluid outlet of said second hydraulic pump to the fluid inlet of said hydraulic device,
   - a suction hose for directly connecting the fluid outlet of said hydraulic device to the fluid inlet of said second hydraulic pump,
   - an inlet hose for connecting the pressurized fluid outlet of the first loop to the suction hose,
   - an outlet hose for connecting the suction hose to the return inlet of the first loop, said outlet hose being connected to the suction hose between said inlet hose and said hydraulic device, and
   - a low pressure relief valve mounted in-line onto said outlet hydraulic hose;
   whereby, in use, the hydraulic fluid circulating within said first loop is supplied to said second loop by said first hydraulic pump under pressure through said inlet hose and is circulated through said second loop by said second hydraulic pump for driving said hydraulic device, any fluid in excess being automatically returned to said reservoir of said first loop through said return hose and thus making it unnecessary for the second loop to have a fluid reservoir and a filter.

2. The improved motorized equipment of claim 1, wherein the second hydraulic pump is a generated orbital rotor pump.

3. The improved motorized equipment of claim 1, wherein said low pressure of said low pressure relief valve is between 50 and 300 psi.

* * * * *